US012680861B2

(12) United States Patent
Cauley, Jr. et al.

(10) Patent No.: US 12,680,861 B2
(45) Date of Patent: Jul. 14, 2026

(54) HANDHELD ELECTRONIC FISH SCALE

(71) Applicant: AOB Products Company, Columbia, MO (US)

(72) Inventors: Dennis W. Cauley, Jr., Fayette, MO (US); James Tayon, Moberly, MO (US); Mark Dalton, Columbia, MO (US); Kyle Martin, Columbia, MO (US); Matthew Kinamore, Columbia, MO (US); Curtis Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 440 days.

(21) Appl. No.: 17/823,863

(22) Filed: Aug. 31, 2022

(65) Prior Publication Data

US 2023/0063284 A1     Mar. 2, 2023

Related U.S. Application Data

(60) Provisional application No. 63/364,311, filed on May 6, 2022, provisional application No. 63/260,780, filed on Aug. 31, 2021.

(51) Int. Cl.
*G01G 19/18*       (2006.01)
*G01G 21/28*       (2006.01)

(52) U.S. Cl.
CPC ........... *G01G 19/18* (2013.01); *G01G 21/283* (2013.01)

(58) Field of Classification Search
CPC ....... G01G 19/18; G01G 19/56; G01G 21/283
See application file for complete search history.

(56) References Cited

U.S. PATENT DOCUMENTS

| | | | | |
|---|---|---|---|---|
| 4,936,399 A | * | 6/1990 | Christman | G01G 19/18 |
| | | | | 177/148 |
| 5,031,710 A | * | 7/1991 | Parker | G01G 3/14 |
| | | | | 177/149 |
| D331,887 S | | 12/1992 | Robbins | |
| D332,922 S | | 2/1993 | Robbins | |
| D333,277 S | | 2/1993 | Robbins | |
| D335,635 S | | 5/1993 | Robbins | |
| 5,545,855 A | * | 8/1996 | Stanfield | G01G 19/18 |
| | | | | 177/148 |
| D409,106 S | * | 5/1999 | Stanfield | D10/89 |
| 5,926,545 A | * | 7/1999 | Wu | H04M 1/0262 |
| | | | | 379/433.08 |

(Continued)

FOREIGN PATENT DOCUMENTS

EP      2023101 A2 *   2/2009  ............ G01G 19/56

OTHER PUBLICATIONS

Machine translation of EP 2023101 (Year: 2008).*

(Continued)

*Primary Examiner* — Natalie Huls
(74) *Attorney, Agent, or Firm* — Stinson LLP

(57) ABSTRACT

An electronic scale holdable by a hand of a user. The electronic scale can have a handle portion sized and shaped for an ergonomic fit to a user's hand holding the handle. The electronic scale can have a batter compartment, such as in a head of the scale, for removably receiving a battery. A load cell of the electronic scale can be configured to measure a weight of a fish suspended from the load cell below the scale.

42 Claims, 12 Drawing Sheets

(56) References Cited

U.S. PATENT DOCUMENTS

| | | | | |
|---|---|---|---|---|
| 5,986,222 | A * | 11/1999 | Helberg | G01G 19/14 |
| | | | | 177/148 |
| 6,222,449 | B1 | 4/2001 | Twining | |
| 6,608,261 | B2 | 8/2003 | Thadani | |
| 6,696,650 | B2 * | 2/2004 | Muller | G01G 19/60 |
| | | | | 177/148 |
| 7,173,197 | B1 * | 2/2007 | Kasperek | A01K 97/00 |
| | | | | 177/148 |
| 7,408,125 | B1 | 8/2008 | Lentine | |
| 7,550,684 | B2 * | 6/2009 | Kritzler | G01G 19/58 |
| | | | | 177/148 |
| 7,645,949 | B1 * | 1/2010 | Thompson | G01G 19/18 |
| | | | | 177/148 |
| D611,374 | S | 3/2010 | Mrshall | |
| 8,921,716 | B2 | 12/2014 | Saulters et al. | |
| 9,476,758 | B2 | 10/2016 | Jones | |
| 10,004,213 | B2 | 6/2018 | Britz | |
| 10,123,521 | B2 | 11/2018 | Castaneda et al. | |
| 10,390,523 | B1 | 8/2019 | Polston | |
| 10,557,747 | B2 | 2/2020 | Kishikawa | |
| 10,557,748 | B2 | 2/2020 | Eide et al. | |
| 10,603,542 | B1 | 3/2020 | Smyser | |
| 11,487,957 | B2 | 11/2022 | Teshirogi | |

| | | | | |
|---|---|---|---|---|
| D997,000 | S | 8/2023 | Cauley, Jr. | |
| 2002/0195282 | A1 * | 12/2002 | Thadani | G01G 19/14 |
| | | | | 177/148 |
| 2003/0127253 | A1 * | 7/2003 | Heyn | G01G 19/60 |
| | | | | 177/148 |
| 2004/0249860 | A1 | 12/2004 | Stechschulte et al. | |
| 2005/0240420 | A1 | 10/2005 | Iverson et al. | |
| 2007/0068270 | A1 * | 3/2007 | Coffey | G01G 19/14 |
| | | | | 73/760 |
| 2008/0029313 | A1 * | 2/2008 | Lentine | G01B 3/1084 |
| | | | | 177/148 |
| 2012/0000713 | A1 | 1/2012 | Taboada | |
| 2015/0316409 | A1 | 11/2015 | Castaneda et al. | |
| 2016/0278360 | A1 | 9/2016 | Battah et al. | |
| 2019/0101435 | A1 * | 4/2019 | Eide | G01G 19/18 |
| 2020/0011728 | A1 * | 1/2020 | Ganahl | G01G 19/18 |
| 2022/0331998 | A1 | 10/2022 | Cauley, Jr. | |
| 2023/0063284 | A1 | 3/2023 | Cauley, Jr. | |

OTHER PUBLICATIONS

Hook Setting Adventures, "Bass Pro Product Review 2020 Model BassPro XPS Scale," YouTube video located at https://www.youtube.com/watch?v=qbnBSa8uTqQ, Sep. 27, 2020.

* cited by examiner

HANDHELD ELECTRONIC FISH SCALE

CROSS-REFERENCE TO RELATED APPLICATION

The present application claims priority to U.S. Provisional Patent App. Nos. 63/260,780 filed Aug. 31, 2021, and 63/364,311 filed May 6, 2022, each of which is hereby incorporated by reference in its entirety for all purposes.

FIELD

The present disclosure generally relates to weighing scales, and more particularly to electronic handheld weighing scales.

BACKGROUND

Handheld weighing scales are commonly used to measure the weight of a fish. A relatively large fish may weigh upwards of sixty pounds. Some handheld weighing scales may prove difficult to grasp while weighing relatively large fish. Improvements to such handheld weighing scales are needed.

SUMMARY

In one aspect, an electronic scale is holdable by a hand of a user for measuring a weight of an object to be weighed. The electronic scale comprises a handle having a front side and a rear side opposite the front side, a top portion and a bottom portion below the top portion, and a gripping portion therebetween configured to be grasped by the hand of the user. The gripping portion is configured to complement ergonomic contours of the hand while the hand is grasping the handle. A head supported by the top portion of the handle has an upward facing upper side and a downward facing lower side, a forward portion and a rearward portion rearward the forward portion. The downward facing lower side includes a bottom face configured to contact a top part of the hand of the user when the gripping portion is grasped by the hand of the user.

In another aspect, an electronic scale holdable by a hand of a user is for measuring weight of an object to be weighed. The electronic scale is usable with at least one battery. The electronic scale comprises a handle and a head supported by the handle. The head includes a battery compartment having a mouth configured to receive the at least one battery. The battery compartment includes at least one electrical contact. A weight sensor supported by the handle is in electrical communication with the at least one battery.

In yet another aspect, an electronic scale holdable by a hand of a user is for measuring weight of an object to be weighed. The electronic scale comprises a handle including a handle housing having a front side and a rear side opposite the front side, a top portion and a bottom portion below the top portion and a gripping portion therebetween configured to be grasped by the hand of the user. A head supported by the top portion of the handle has an upward facing upper side and a downward facing lower side, a forward portion and a rearward portion rearward from the forward portion. The downward facing lower side includes a bottom face configured to contact a top part of the hand of the user when the gripping portion is grasped by the hand of the user. A weight sensor is mounted below a top of the handle and operatively connected to the at least one battery.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
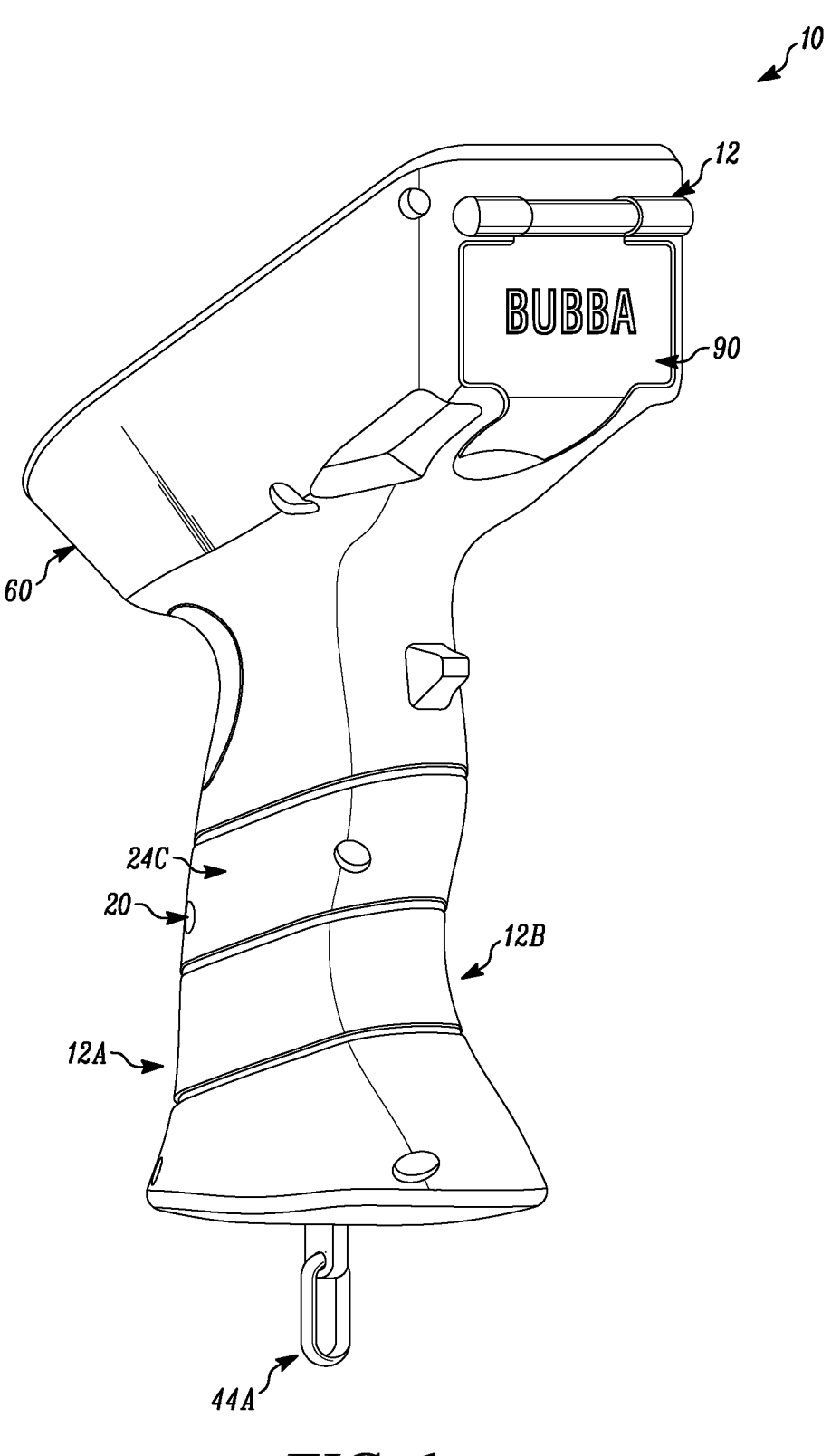
FIG. 1 is a right perspective of an electronic fish scale.
Figure 2:
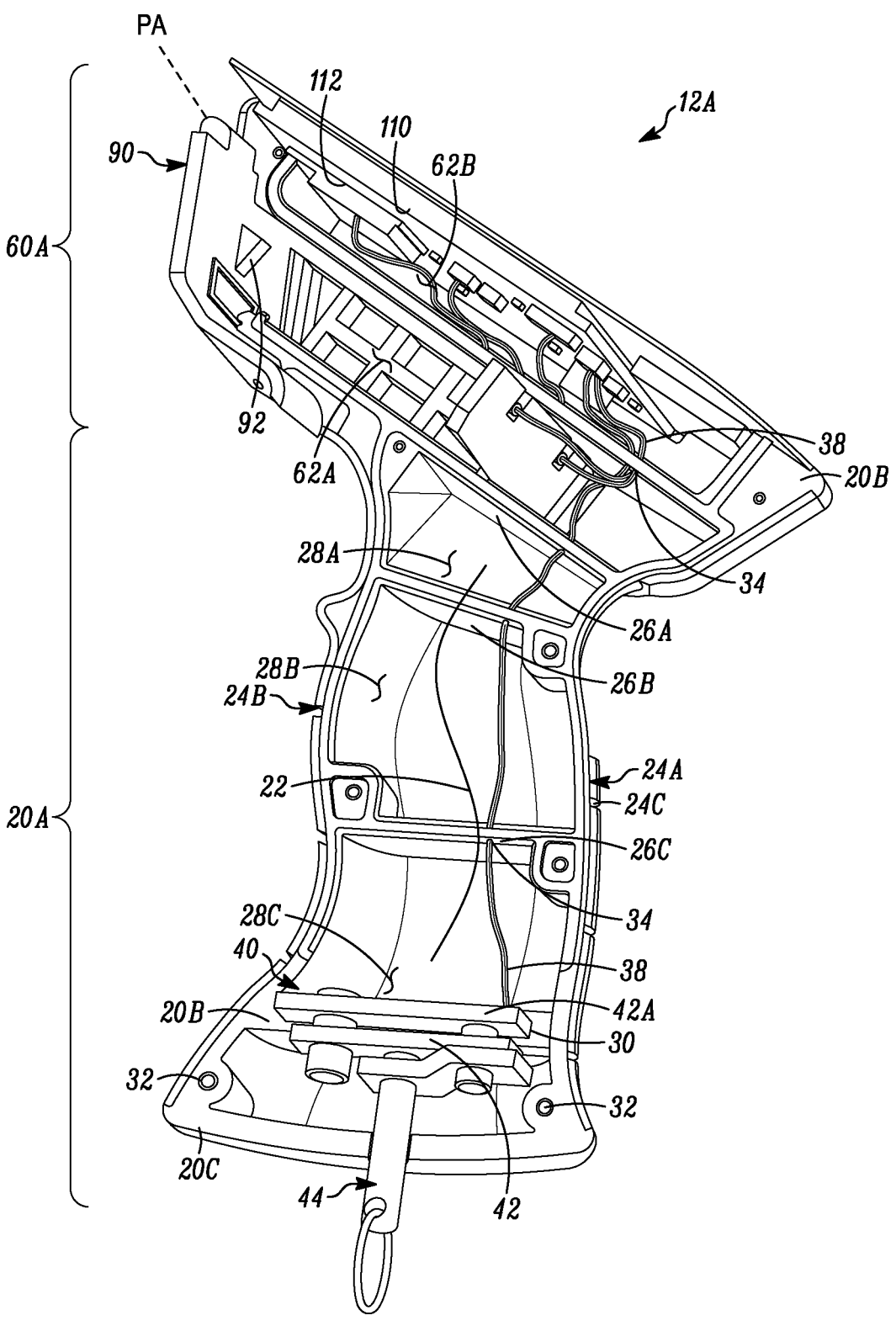
FIG. 2 is a left perspective of a right housing portion.

Referring to FIGS. 1 and 2, a first embodiment of an electronic fish scale of the present disclosure is generally indicated by 10. The electronic fish scale can be used to measure the weight of a fish (broadly, object) up to about sixty pounds or more.

A housing 12 of the electronic fish scale 10 comprises a handle 20 and a head 60 supported by the handle. The housing 12 houses internal electronic components such as a load cell (sensor) assembly 40 and a battery 80 (broadly, power source). The housing 12 is sized and shaped to be grasped by either one or both hands of a user (fisherperson) while the fish is suspended below the handle via a connector 44A. As will be explained in greater detail below, the head is configured to contact a top part of the fisherperson's index finger and thumb (broadly, hand) while weighing the fish. Such contact assists the fisherperson in handling the weight of the fish suspended below the electronic fish scale.

In use, the internal electrical components may communicate useful data to the fisherperson via a user interface. For example, the data may include the weight of the fish, the bag weight of all the fish they have caught during an outing, where a specific fish ranks in comparison to the other fish caught in the outing (broadly, culling), global positioning system (GPS) location of where the fish was caught, etc.

The handle defines an interior cavity 22 and the head defines a compartment 62. The interior cavity 22 is sized and shaped to house the load cell assembly 40. The compartment comprises a battery compartment 62A sized and shaped to house the battery 80, and an electrical compartment sized and shaped to house various internal electronic components. In the illustrated embodiment, the housing includes right (first) and left (second) housing portions 12A, 12B. The right and left housing portions have complementary features that, when connected, define the interior cavity 22 and the compartment 62

Referring to FIG. 2, the right housing portion 12A will be described in greater detail with the understanding the left housing portion 12B is substantially similar but a mirror image. Accordingly, with respect to the right and left housing portions "right" and "left" indicators for respective "right" and "left" features will generally be omitted.

A part of the housing portion that defines part of the interior cavity 22 of the handle 20 can generally be referred to as a handle housing 20A. The handle housing 20A is sized and shaped to house and support the load cell assembly 40 (broadly, weight sensor), as will be explained in more detail herein. The handle housing includes a rear side, a front side opposite the rear side, left and right sides therebetween, and a top portion and a bottom portion below the top portion. The handle housing includes a housing body 20B comprising a rear side wall 24A, a front side wall 24B opposite the rear side wall, and a side wall 24C connecting the rear and front side walls. The walls share a common interior surface. The housing body includes ribs 26A, 26B, 26C which extend between the walls. The housing body defines mounts 30 (broadly, load cell connection structure), as will be described in greater detail below. The housing body has an end portion 20C (facing out of the page, as shown in FIG. 2). The end portion defines openings 32 for receiving fasteners for connecting the right and left housing portions. In the illustrated embodiment, the housing body is formed from injection molded plastic, but any suitable material can be used.

As shown in FIG. 2, the rear and front side walls 24A, 24B extend generally into the page while the side wall 24C extends generally therebetween. The rear side wall has a curved profile different than the front side wall, as will be explained in greater detail below. Each interior surface of the rear and front side wall smoothly transitions into the side wall. In the illustrated embodiment, first, second, and third ribs 26A, 26B, 26C are spaced apart between the rear, front, and side walls to define first, second, and third chambers 28A, 28B, 28C of the handle housing. The ribs define receivers 34 for receiving wiring 38. The ribs may provide structural support to the handle.

The mounts 30 include support members protruding inward from the interior walls. In the illustrated embodiment, a pair of mounts 30 protruding from opposite sides of the interior walls are configured to support the load cell assembly. The load cell assembly 40 includes a load cell (sensor), a mounting bracket 42A (broadly, housing body connection structure), and a connector body 44. The mounting bracket includes a plate which defines openings for receiving fasteners (e.g. bolts) for connecting the plate to the mounts. The load cell is operatively supported below the plate and includes a strain gauge. The connector body 44 includes a proximal end operatively connected to the load cell and a distal end opposite the proximal end. The distal end of the connector body includes a recess configured to receive a ring 44A (broadly, connector). The connector body 44 defines a longitudinal weighing axis WA extending through the connector body and the handle housing.

The load cell assembly is mounted below the head 60 and below the upper end of the handle 20. In the illustrated embodiment, the mounts 30 are located in the third chamber 28C. Each mount comprises a slot sized and shaped for receiving a respective side of the mounting plate. Each slot includes holes for aligning with the holes of the mount. Fasteners (e.g. bolts) can be used for fastening the mounting plate to the slot. The distal end of the connector body 44 protrudes downward through an opening defined by the bottom portion of the handle.

Figure 3:
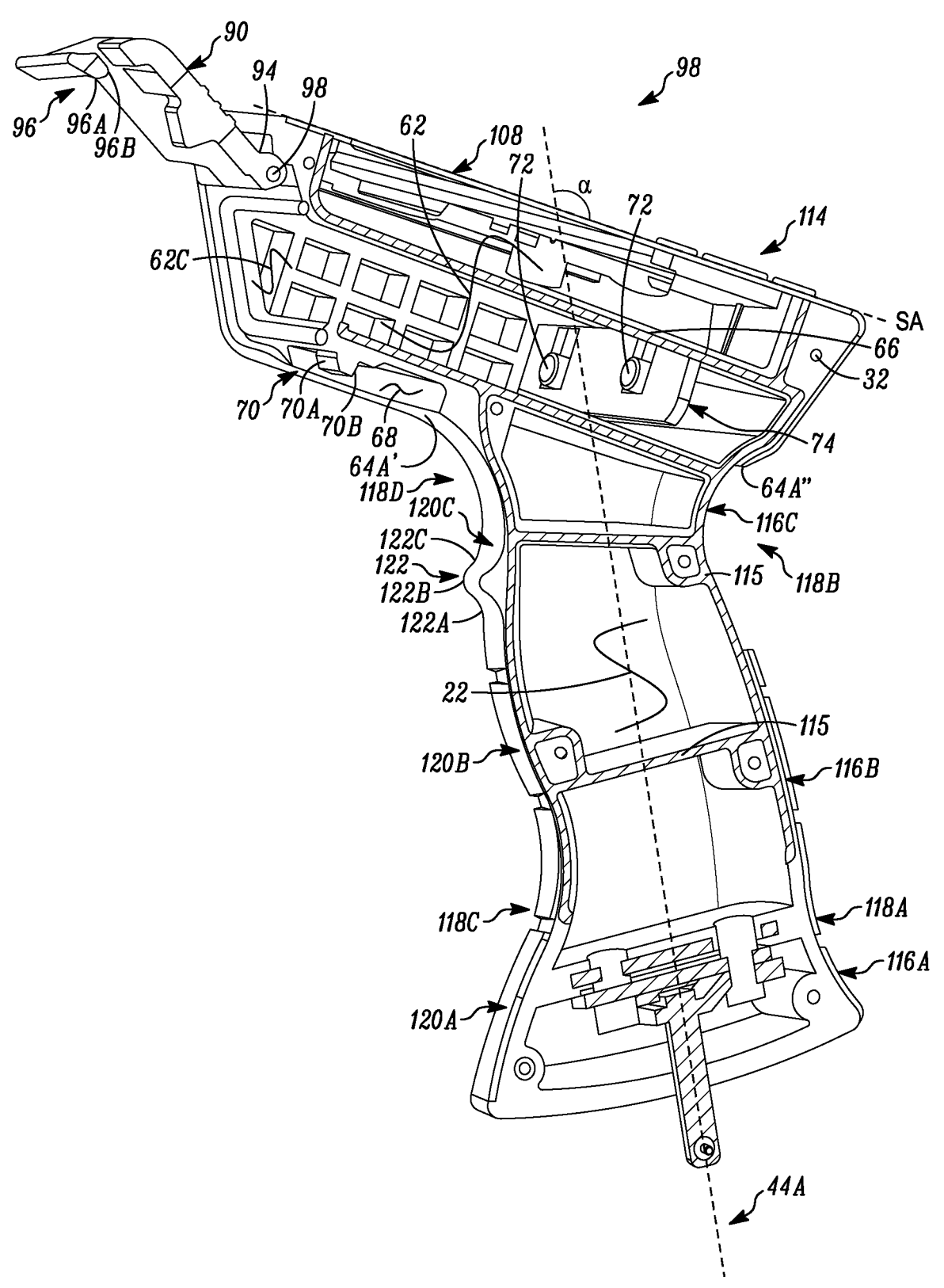
FIG. 3 is a left perspective of the right housing showing a battery compartment door in an open position.
Figure 4:
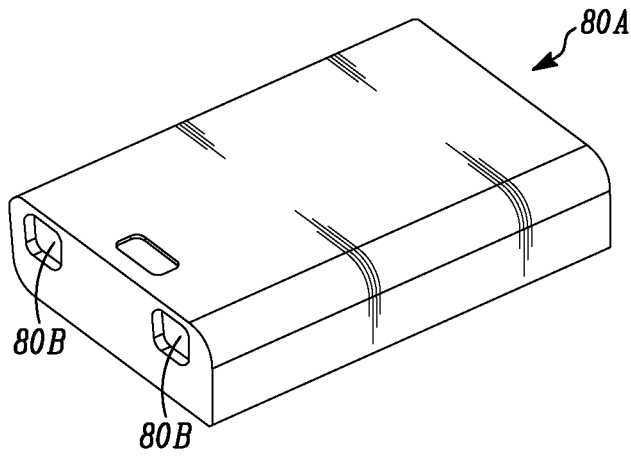
FIG. 4 is a perspective of a lithium battery pack.
Figure 5:
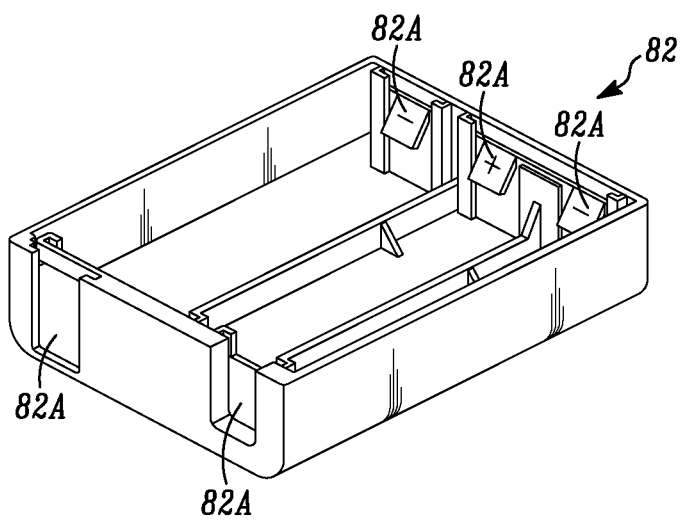
FIG. 5 is a perspective of a battery tray.
Figure 6:
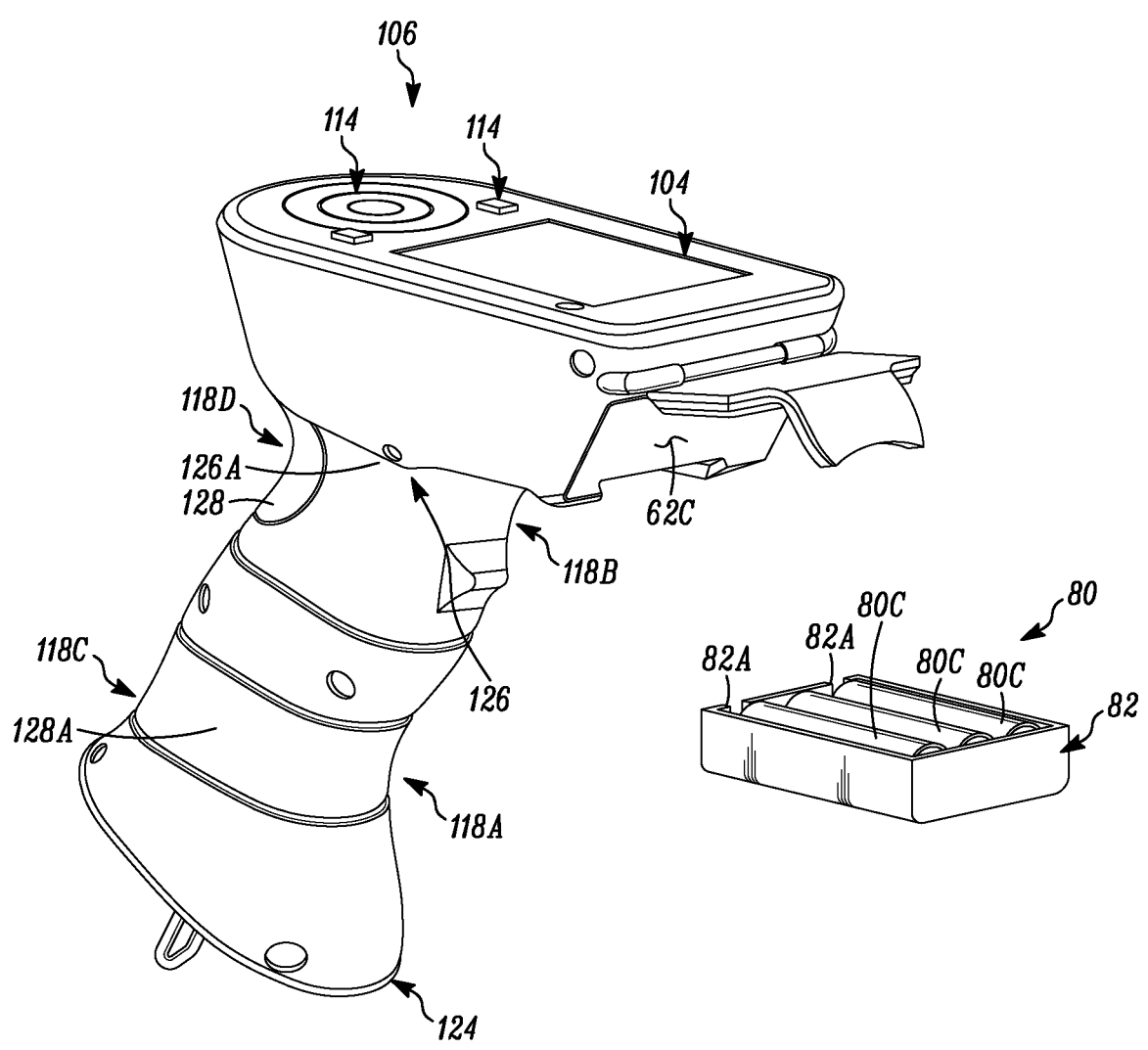
FIG. 6 is a perspective of the electronic fish scale and the battery tray holding batteries.

Referring to FIG. 3, a part of the housing 12 that defines part of the compartment 62 can generally be referred to as a head housing 60A. The head housing 60A is sized and shaped to house the battery and other electrical components. The head housing 60A has a rearward portion and a forward portion opposite the rearward portion. The head housing includes the housing body 20B comprising a bottom wall 64A, top wall 64B, a rear wall 64C, and side walls 64D extending forward from the rear wall. The walls share a common interior surface. The top wall defines an opening. The housing body includes an intermediate wall 66 (broadly, compartment partition wall) for separating the battery compartment 62A from the electronic compartment 62A. In the illustrated embodiment, distal ends of the walls define a mouth 62C of the battery compartment. The bottom wall has a bottom face 64A' which faces generally downward. A portion of the bottom face 64A' comprises an abutment surface indicated by 64A". The abutment surface 64A" is configured to receive the Purlicue (broadly, web of hand) of the fisherperson's hand. The Purlicue is that space on a person's hand between the index finger and thumb. The bottom wall comprises a finger recess 68 and a retainer 70 (broadly, cover connection structure). In the illustrated embodiment, the retainer includes a lip 70A having a barb 70B. The housing body defines openings 32 for receiving fasteners to connect the housing portions.

In the illustrated embodiment, the battery compartment 62A is sized to house the length and width of three AA batteries. The battery compartment 62A includes electrical contacts 72 for operatively engaging with the batteries 80. In the illustrated embodiment, a panel 74 supports the electrical contacts 72. The panel is mounted to the intermediate wall 66. In the illustrated embodiment, the panel defines part of the battery compartment 62A. The electrical compartment houses part of a control system 100 comprising a controller 102 (e.g., printed circuit board), the power source 80, user interface 106, a display screen 108, a tangible storage medium 112 (TSM), and wiring 38 (broadly, circuitry). The user interface comprises a user input 106A which includes the display screen 108 and buttons 114 (broadly, actuators). The display screen is viewable through the opening defined by the top wall of head. In the illustrated embodiment, the display screen 108 lies in a screen plane SA. The screen plane SA intersects the weighing axis WA at a skew angle α. Desirably, the angle is greater than 90 degrees. Such an angle tilts the screen toward the user's line of sight. The buttons 114 are located near a periphery of the top side of the head such that the user may press the buttons with a thumb of the hand grasping the handle. In the illustrated embodiment, below the display is a backlit screen.

The control system of the electronic scale can store weights detected by the load cell assembly. The display can show the weight in real time being detected by the load cell assembly. The control system can have a "Bag Weight" mode or feature were the display shows the total weight of all the weights (or a subset thereof such as all the weights from that day) stored in the control systems memory (e.g., a total weight of all the fish weighed). For example, the total weight can represent the weight of all the fish currently held in a live well. The control system can have a "Cull" mode or feature where the display indicates which weight in the memory is the least so that when a user has exceeded a bag limit and catches a heavier fish, the display identifies which fish the user should release. The control system can have a "Rally" mode or feature where the control system compares the weight of the newest weighed fish to all the weights in the memory, so that the user knows whether the newest fish is the heaviest or where it ranks among the other recorded weights. It will be appreciated that the tangible storage medium 112 stores instructions executable by the controller 102, and is responsive to the user input 106A and the load cell 40, to carry out these functions and modes.

Each battery includes positive and negative electrical contacts on opposite ends thereof. In the illustrated embodiment, the batteries include a lithium battery pack 80A having electrical contacts 80B. Alternatively, the scale may be powered by three AA batteries indicated generally by 80C. A tray 82 (battery holder) is configured to hold the three AA batteries. Interior end surfaces of the tray include electrical contracts 82A for engaging with the batteries held therein. In the illustrated embodiment, one exterior end of the tray includes electrical contact ports for operatively engaging with the electrical contacts of the battery compartment 62A.

Wiring 38 operatively connects the load cell assembly 40 to the battery 80 and controller 102. The receivers 34 defined by the ribs and intermediate wall permit the wiring to be routed through housing body.

Referring to FIGS. 2 and 3, a compartment door 90 (broadly, cover) is sized and shaped to cover the area of the mouth 62C. The compartment door 90 includes an interior, exterior surfaces, and upper and lower side portions. The upper side portion includes a pivot arm 94 (broadly, head connection structure). The pivot arm defines an opening configured to receive a pin 98. The lower side of the door includes a keeper 96 (broadly, head connection structure) configured to engage with the retainer 70 of the head. The keeper 96 includes a latch 96A for engaging with the barb 70B of the retainer 70. The pivot arm of the door is configured to align with the pivot arms of the head. The pin 98 feeds through the pivot arms and defines a pivot axis PA. The pivot axis permits the door to move between open and closed positions. In the illustrated embodiment, a pusher member 92 protrudes from the interior surface of the cover. Other door connections (e.g. living hinge) are possible without departing from the scope of this disclosure.

In the closed position, the keeper of the door is engaged with the retainer of the head. It will be appreciated the keeper/retainer engagement is located on the bottom face 64A' of the head. In the illustrated embodiment, the pusher member 92 of the door pushes the battery into operative engagement with the electrical contacts of the battery compartment, depending on the power source being used. If the power source is the tray 82, the pusher member will push on a wall of the tray holding the batteries, causing the opposite wall to engage the electrical contacts of the battery compartment. If the power source is the lithium battery pack 80A, the pusher member will push on an outside side of the pack, causing the opposite side to engage the electrical contacts of the battery compartment. Such operative engagement closes the electrical circuit and supplies power to the control system. In the open position, the keeper disengages from the retainer. The disengagement causes the pusher member to break contact from the battery, causing the battery to disengage from the electrical contact of the battery compartment which opens the circuit. Other configurations can be used without departing from the scope of the present disclosure.

The configuration of the keeper/retainer arrangement is such that the user may open and close the door by latching and/or unlatching the keeper from the retainer with one hand without the use of any tools. Specifically, the user inserts a fingertip into the finger recess 68 to unlatch the keeper. It will be appreciated that the keeper/retainer arrangement is enclosed by the finger recess to prevent the keeper from inadvertently unlatching from the retainer.

The housing portions are waterproofed prior to being connected. An epoxy (broadly, sealant) is applied to the interior surfaces and connection joints. A gasket 115 (broadly, sealing material) may be installed over the connection joints. FIGS. 2 and 3 illustrate the gasket bounding the electrical compartment, the battery compartment, the first and second chambers, and most of the third chamber. FIG. 2 illustrates the gasket raised slightly above the end portion 20C to ensure the seal is watertight and there is no gapping when the housing portions are connected. A waterproof wiring harness and/or sealant (e.g., epoxy) may be installed in the grooves defined by the ribs to ensure the wires do not contact water or moisture.

Figure 7:
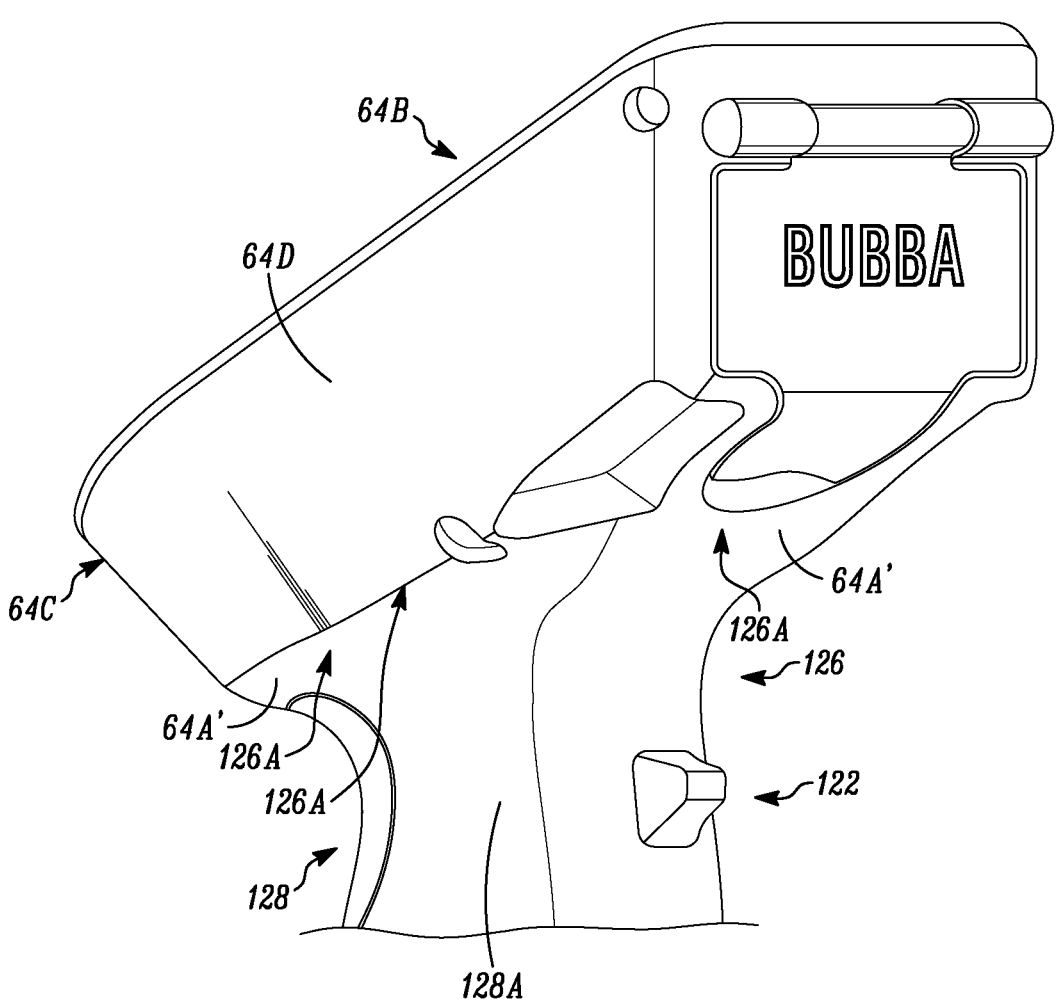
FIG. 7 is an enlarged fragmentary right perspective of the electronic fish scale.
Figure 8:
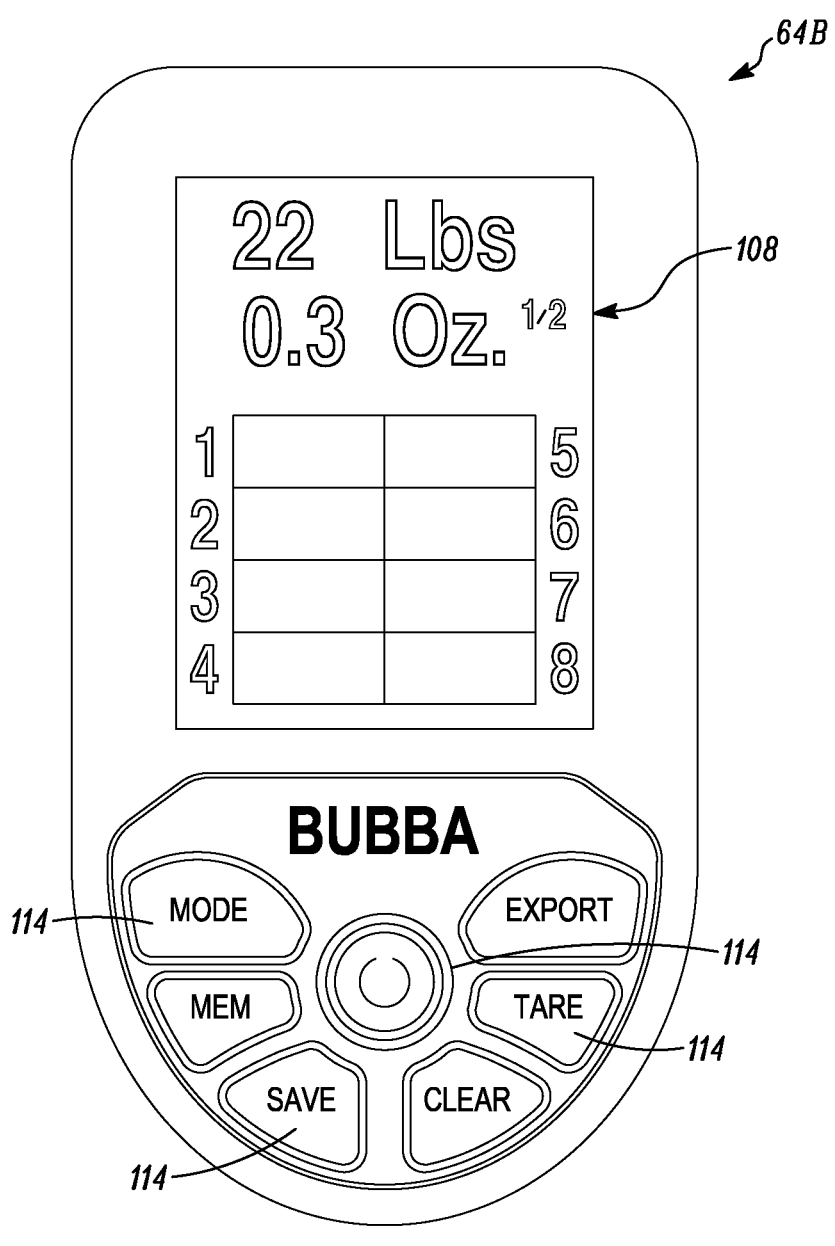
FIG. 8 is a top view of the electronic fish scale.
Figure 9:
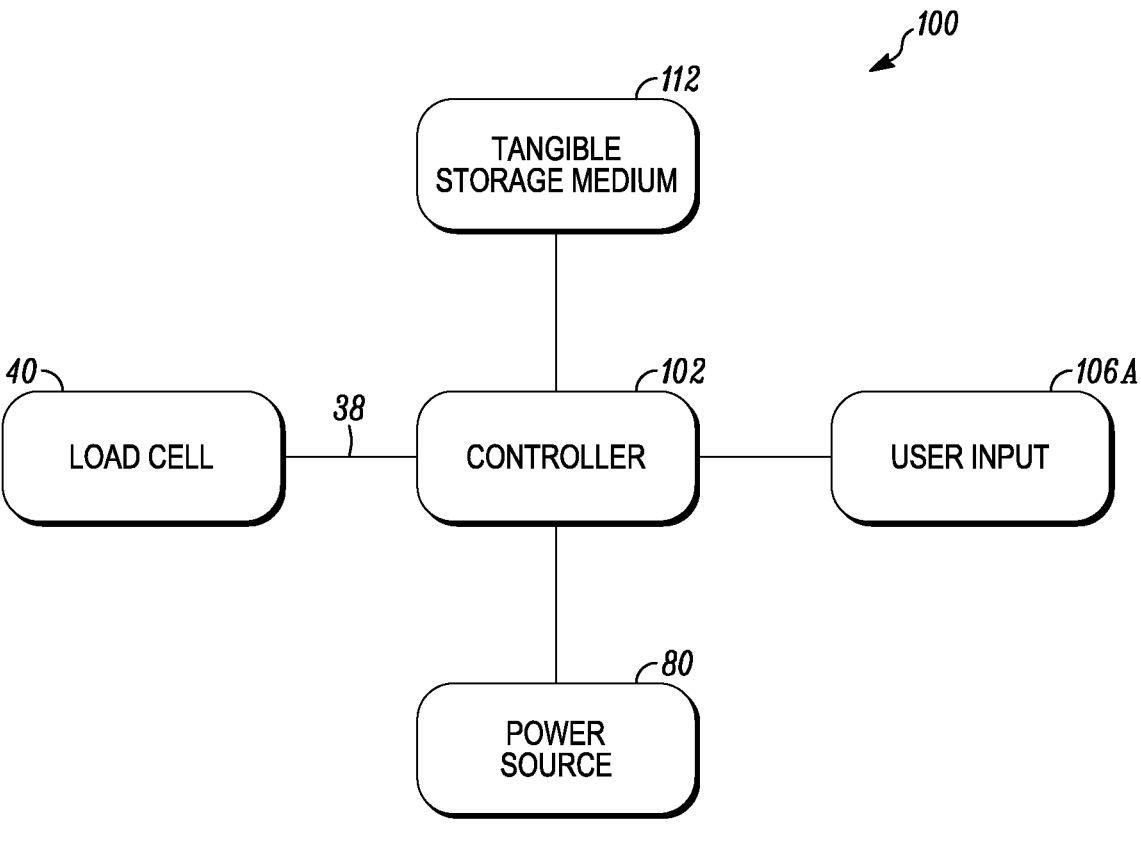
FIG. 9 is a block diagram of a control system of the electronic fish scale.
Figure 10:
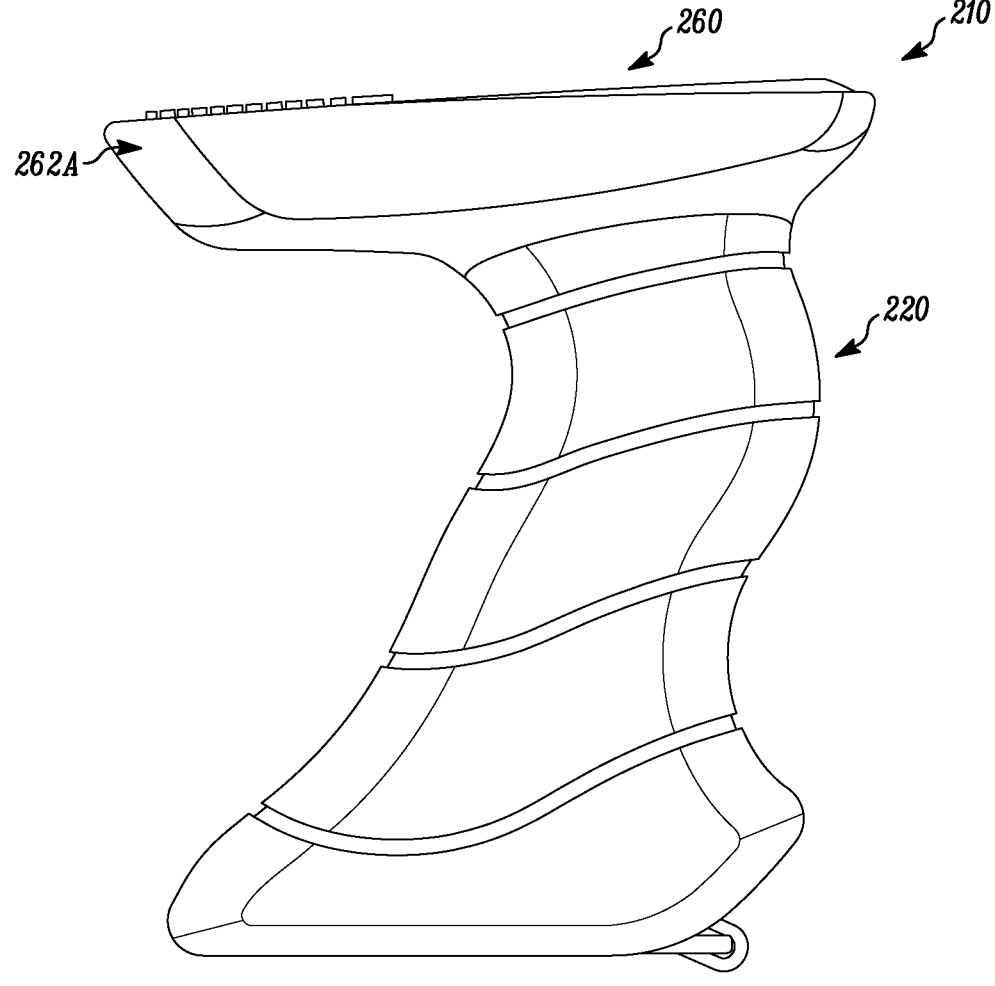
FIG. 10 is a left elevation of a second embodiment of an electronic fish scale.

In view of the above, it is understood the electronic scale is formed more generally when the left and right housing portions are connected. Referring to FIG. 7, the top portion of the handle transitions into the bottom wall 64A' of the head. The bottom side of the head extends outwardly from the top portion of the handle. The configuration is such that the handle is bounded by a projection of the perimeter of the head, or the handle lies in a footprint of the head.

An ergonomic shape of the handle assists the fisherperson while weighing a fish. The configuration is such that the fisherperson may grasp the handle with either their left or right hand, or both left and right hands together. A handle axis HA extends through the handle and coincides with the weighing axis WA, generally indicated by WA/HA. In the illustrated embodiment, the handle is configured to resemble a grip (e.g., pistol grip) of a handheld firearm (e.g. a pistol, revolver, etc.). Referring to FIG. 3, the rear side of the handle comprises three curving segments 116A, 116B, 116C which together form a slight concave surface of the rear side of the handle. The first segment 116A curves slightly inwardly before smoothly transitioning back slightly outwardly into transition with the second segment. The transition of the first and second segments forms a first indentation 118A. The second segment 116B slopes generally upwardly but slowly slopes outwardly and back inwardly until it transitions into the third segment 116C. The third segment has a more pronounced curve rearwardly where it transitions into the bottom face of the head. The transition of the third segment to the bottom face of the head forms a second indentation 118B. The front side of the handle, comprises three curving sections 120A, 120B, 120C. The first section 120A slopes inwardly and upwardly (more upwardly than the first segment of the rear side of the handle), before transitioning into the second section 120B. The transition of the first and second sections forms a third indentation 118C. The second section slopes slightly outwardly and slightly back inwardly until it transitions to a rib 122. The rib includes a first jog 122A forward, a peak 122B, and a second jog rearward 122C. The second jog transitions to the third section. The third section is generally upright then has a more pronounced forward curve transitioning to the bottom face of the head. The transition from the third section to the bottom face of the head forms a fourth indentation 118D. The slopes of the first segment 116A and first section 120A together form a foot 124 at a base portion of the handle. The slopes and the transitions (broadly, curvatures) that make up the indentations provide smooth transition surfaces that that are sized and shaped to correspond with the ergonomics of the user's hand when the user is grasping the handle. "Smooth transition surfaces," generally means surfaces that gradually change course and do not form abrupt angles. For example, such abrupt changes in course may create an undesirable pinch-point or pressure-point on the user's hand. The configuration is such that the curvatures provide a comfortable grip. Modification to the ergonomics of the handle are not outside the scope of this disclosure.

Referring to FIG. 7, a neck 126 of the handle is formed by the second and fourth indentations 118B, 118D. A shoulder 126A is formed by transition of the upper parts of the second and fourth indentations into the bottom face 64A' of the head. The rib 122 may assist the user in locating the shoulder 126A. A gripping pad 128 may be installed over the neck of the rear side of the handle for added comfort when grasping the handle. The gripping portion is overmolded with a thermoplastic elastomer gripping material 128A (e.g. Kraton) to further assist the user when grasping the handle. The handle and head configuration combined with the gripping material improves the fisherperson's control of the handle while weighing a heavy object (e.g. a fish).

In use, the fisherman connects the connector hook to the fish, or vice versa. Grasping the handle, the user suspends the fish from the scale. The strain gauge transmits an electrical signal to the controller 102 via the wiring 38. The tangible storage medium stores a value representative of the weight of the fish. The display shows a value representative of the weight of the fish.

Figure 11:
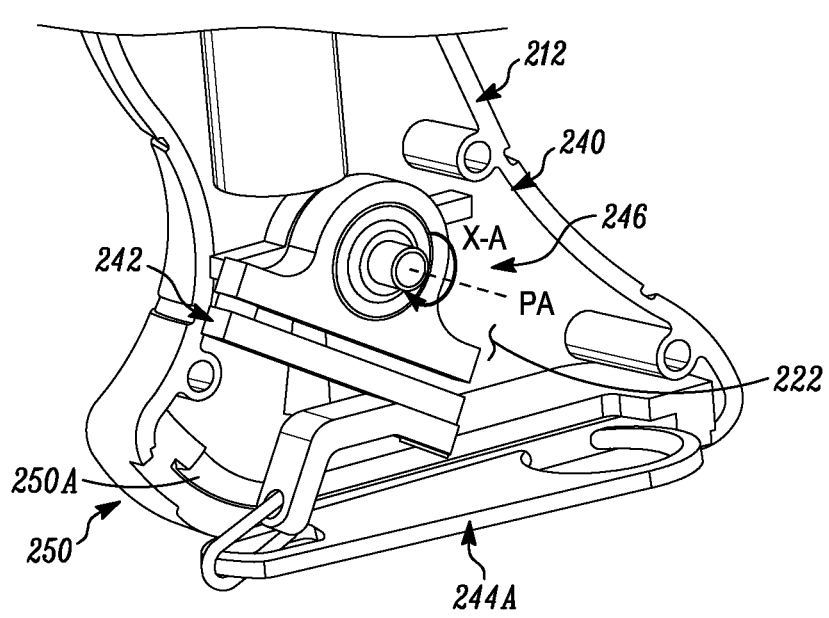
FIG. 11 is an enlarged fragmentary right perspective of a load cell assembly of the second embodiment.
Figure 12:
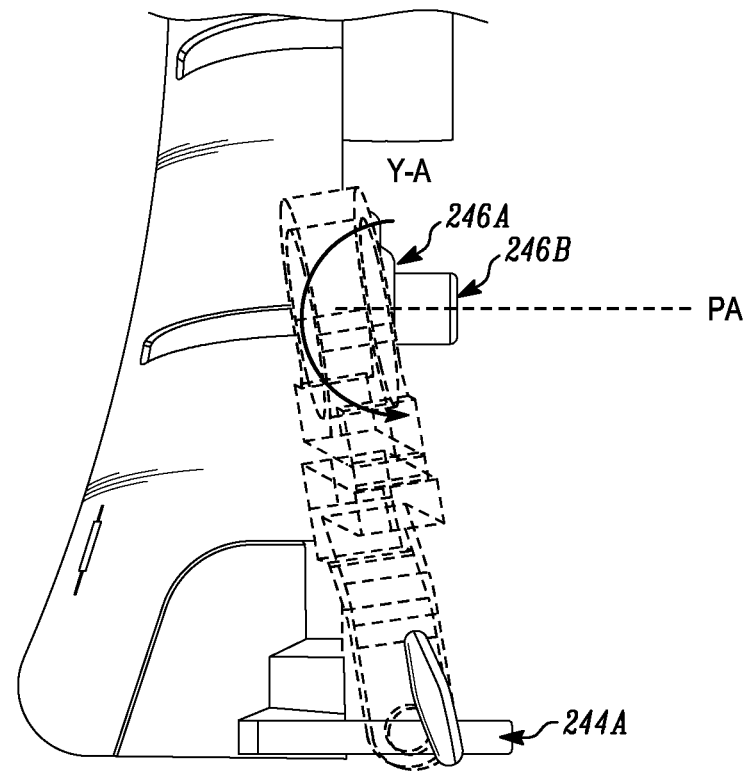
FIG. 12 is an enlarged rear elevation of the load cell assembly of the second embodiment.

Referring to FIGS. 10-13, the electronic scale 210 is similar to the electronic scale 10 and the like components are indicated by like reference numbers, plus 200. For example, the electronic scale 210 includes a housing 212, a handle 220, a head 260 supported by the handle, a battery compartment 262A to house a battery, and a load cell assembly 240 housed by an interior cavity 222 of the handle. In this embodiment, a swivel connection 246 connects the load cell assembly to the body of the handle. The swivel may include a single axis (e.g., x-axis), indicated X-A, or a multi-axis (e.g. x-axis and y-axis), indicated Y-A, swivel, that allows the load cell assembly to pivot relative to the housing. As illustrated by FIGS. 11-12, the swivel includes a swivel bearing 246A that rotates about a pin supported by the housing. The pin defines a pin axis PA in which the bearing moves about. The swivel bearing allows rotation about the x-axis and the y-axis. The swivel connection enables the load cell to articulate or pivot due to the relative position of the housing and the object being weighed to promote a perpendicular status to the direction of pull against the load cell. For example, a user's hand may unintentionally move, rotate, and/or shake as the object is being weighed by the scale. The swivel ensures the force applied by the object is generally perpendicular to the load to ensure an accurate measurement by the load cell.

Figure 13:
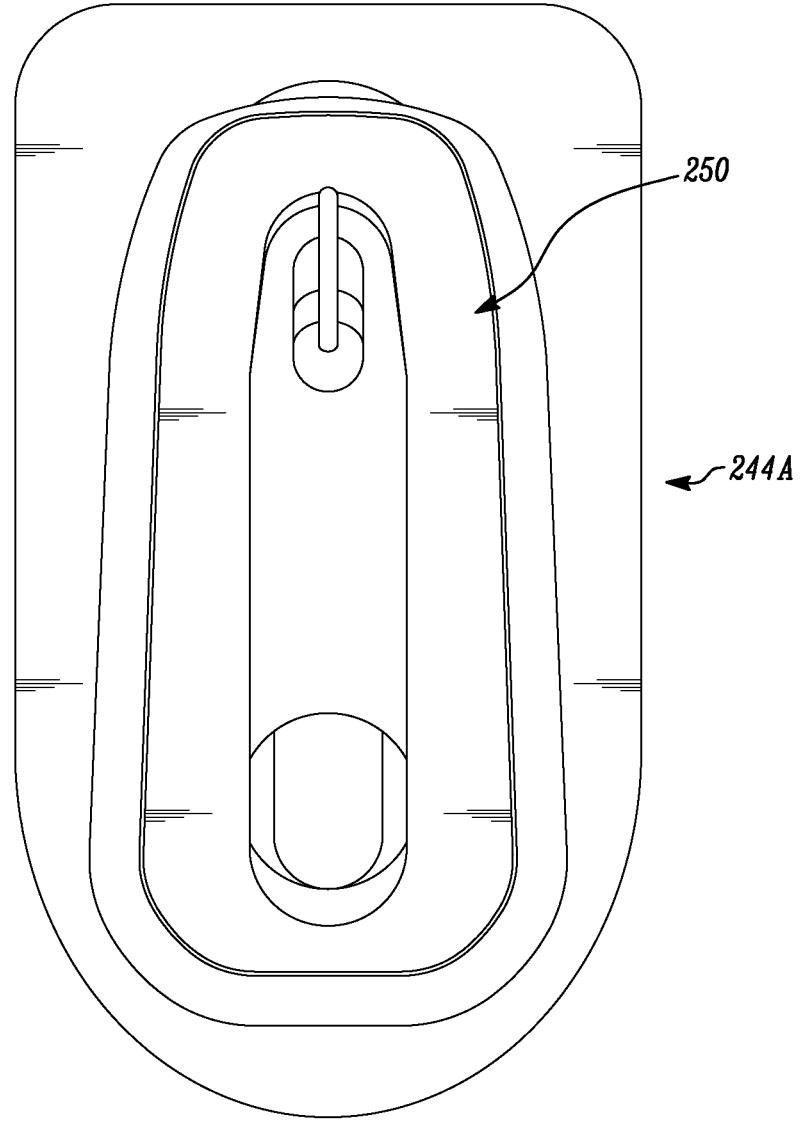
FIG. 13 is a bottom view of the electronic fish scale of the second embodiment.

Referring to FIG. 13, the connector includes a hook 244A connected to the load cell assembly. A base portion of the handle housing comprises a receiver 250 configured to permit the scale to rest upright in a standing position on a support surface, such as a table. To allow this to happen, the hook is captured and stowed in the base portion of the handle. In the illustrated embodiment, the receiver includes a resiliently deformable sleeve 250A (e.g. resiliently compressible) flexible polymer component. The swivel allows the hook to rotate and be tucked into the sleeve. Other configurations (e.g. friction fit, snap fit, etc.) maybe used to enable the foot of the handle to stand freely on a support surface without interference from the hook.

Figure 14:
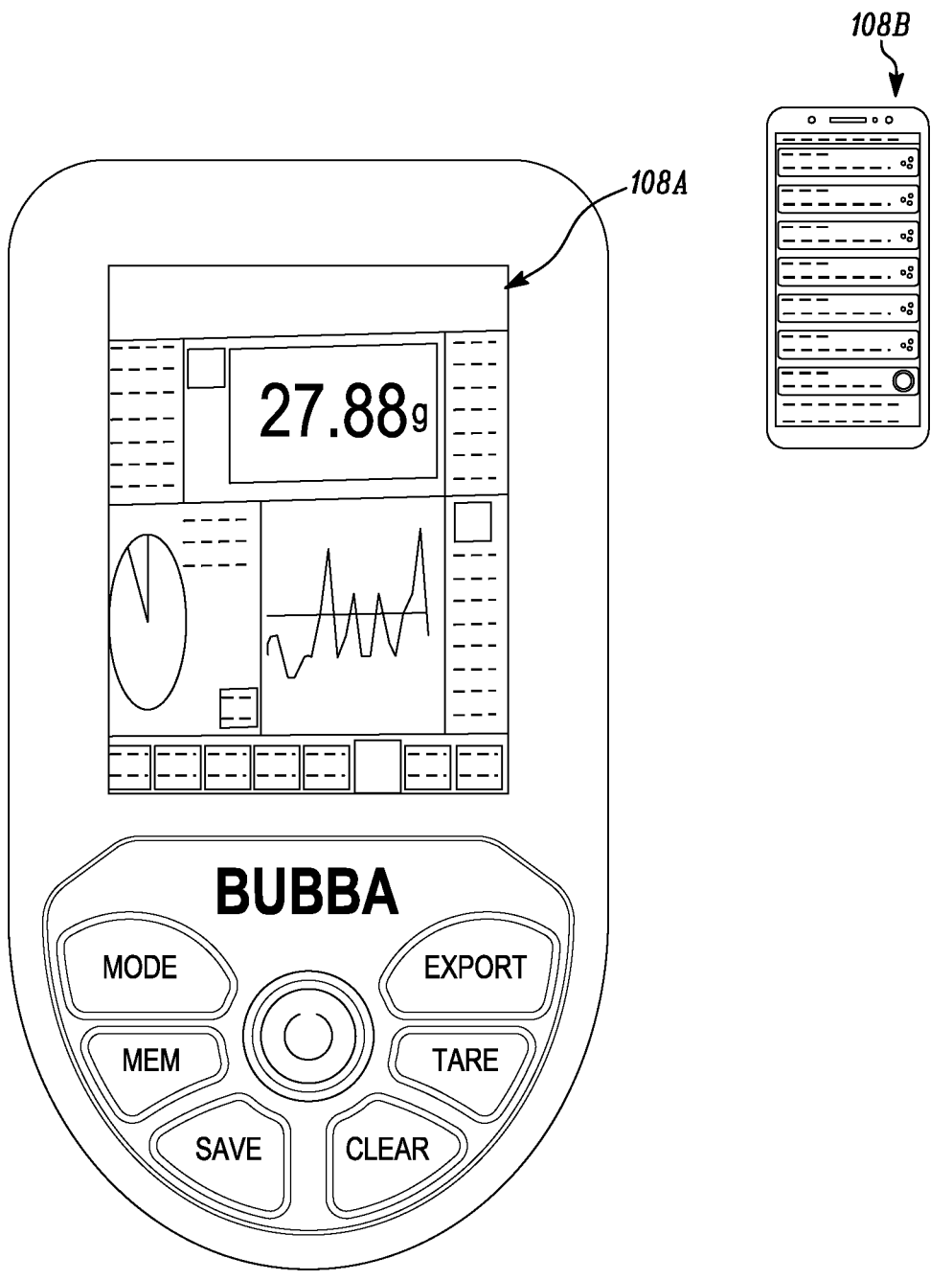
FIG. 14 is another embodiment of the control system of the present disclosure.

Referring to FIG. 14, in another embodiment, the user interface of the electronic scale may be a liquid-crystal display (LCD) screen 108A. The control system of the electronic scale may also include wireless connectivity (e.g., wifi, Bluetooth, etc.) to connect with a mobile device or smart device such as a cell phone, tablet or computer, generally indicated as 108B. For example, the electronic scale can be connected to a cell phone so that the information (e.g., weights) from the electronic scale can be viewed on the cell phone using an app. The scale may include a location sensor (e.g., GPS sensor) for logging location of a weight measurement representing location of where a fish was caught and weighed. This information can be transmitted wirelessly (e.g., via Bluetooth) to the smart device. The electronic scale may also have an internal rechargeable battery and an electrical port (e.g., USB port) for charging the rechargeable battery.

Freshwater and saltwater fisherpeople alike are often interested in recording statistical data about the fish they catch. For example, such information can include the weight of the fish, the bag weight of all the fish they have caught during an outing, where a specific fish ranks in comparison to the other fish caught in the outing, global positioning system (GPS) location of where the fish was caught, etc. Handheld weighing scales according to the present disclosure may be used to measure the weight of the fish. A weighing scale can permit the fisherperson to use both hands while measuring the weight of a sizeable fish (e.g. around 60 pounds).

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electronic scale holdable by a hand of a user for measuring a weight of an object to be weighed, the electronic scale comprising:
   a handle having a front side and a rear side opposite the front side, a top and a bottom below the top, and a gripping portion extending between the top and bottom, the gripping portion being configured to be grasped by the hand of the user, the gripping portion being configured to complement ergonomic contours of the hand while the hand is grasping the handle;
   a head supported by the handle, the head having an upward facing upper side and a downward facing lower side, a forward portion and a rearward portion rearward the forward portion, the downward facing lower side being configured to contact a top part of the hand of the user when the gripping portion is grasped by the hand of the user, the lower side including left and right shoulder segments disposed over left and right sides, respectively, of the handle, the left and right shoulder segments positioned between the forward and rearward portions of the head, the left and right shoulder segments being arranged to contact the top part of the hand of the user when an index finger of the hand of the user wraps around the gripping portion to grasp the handle.

2. The electronic scale of claim 1, wherein the handle and the lower side of the head forms a smooth transition surface sized and shaped to receive the index finger and a thumb of the hand of the user.

3. The electronic scale of claim 2, wherein the front side of the handle includes a concave portion configured to receive the index finger.

4. The electronic scale of claim 3, wherein the concave portion is a first concave portion and the rear side of the handle includes a second concave portion configured to receive a web portion of the user's hand.

5. The electronic scale of claim 4, wherein the first and second concave portions form a neck of the handle, the neck of the handle comprises a smooth transition surface configured to receive the index finger and thumb of the hand of the user.

6. The electronic scale of claim 5, wherein the front side of the handle includes a protrusion adjacent the neck.

7. The electronic scale of claim 5, wherein the front side of the handle includes an indentation.

8. The electronic scale of claim 7, wherein the indentation is a first indentation, and the rear side of the handle includes a second indentation.

9. The electronic scale of claim 8, wherein the first indentation is sized differently than the second indentation.

10. The electronic scale of scale of claim 4, wherein the rearward portion of the head comprises a smoothly transitioning abutment surface configured to engage the web of the hand.

11. The electronic scale of claim 1, wherein the handle is a pistol grip.

12. The electronic scale of claim 11, wherein the handle is overmolded with a thermoplastic elastomer material.

13. The electronic scale of claim 1, wherein the lower side includes a front shoulder segment disposed over a front side of the handle, the front shoulder segment extending between and having a smooth transition with the left and right shoulder segments, the front shoulder segment being arranged to contact the top part of the hand of the user when the gripping portion is grasped by the hand of the user.

14. The electronic scale of claim 13, wherein the lower side includes a rear shoulder segment disposed over a rear side of the handle, the rear shoulder segment extending between and having a smooth transition with the left and right shoulder segments, the rear shoulder segment being arranged to contact the top part of the hand of the user when the gripping portion is grasped by the hand of the user.

15. An electronic scale holdable by a hand of a user for measuring a weight of an object to be weighed, the electronic scale usable with at least one battery, the electronic scale comprising:

a head including a battery compartment having a mouth configured to receive the at least one battery, the battery compartment including at least one electrical contact;

a handle supporting the head, the handle extending downward away from the head, the handle configured to be held in an upstanding orientation when in use for measuring the weight of the object, the head being disposed above the handle when the handle is held in the upstanding orientation when in use for measuring the weight of the object;

a weight sensor supported by the handle, the weight sensor in electrical communication with the at least one electrical contact; and a display disposed on an upper side of the head, the display being arranged to face generally upward when the handle is held in the upstanding orientation.

16. The electronic scale of claim 15, further comprising the at least one battery, wherein the at least one battery comprises a lithium battery pack, and the compartment is configured to receive the lithium battery pack.

17. The electronic scale of claim 15, further comprising the at least one battery, wherein the at least one battery comprises a battery holder, and the compartment is configured to receive the battery holder.

18. The electronic scale of claim 17, wherein the battery holder is configured to hold multiple batteries.

19. The electronic scale of claim 15, further comprising a cover sized and shaped to cover the mouth of the compartment, wherein the head comprises cover connection structure and the cover comprises head connection structure, and wherein the cover is moveably configurable between open and closed positions.

20. The electronic scale of claim 19, wherein the head connection structure includes at least one pivot connector adjacent the mouth and a least one keeper adjacent another side of the mouth.

21. The electronic scale of claim 20, wherein the cover connection structure includes at least one pivot connector and at least one retainer.

22. The electronic scale of claim 21, wherein a rod pivotably connects the at least one pivot connector of the head to the at least one pivot connector of the cover so the cover can pivotably move between the open and closed positions, in the closed position the at least one retainer releasably engaging the at least one keeper, and in the open position the at least one retainer being disengaged from the at least one keeper.

23. The electronic scale of claim 22, wherein a pusher member protrudes from an interior surface of the cover, the pusher member is configured to push the at least one battery into operative engagement with the at least one electrical contact in response to the cover being in the closed position.

24. The electronic scale of claim 15, wherein the at least one electrical contact is supported by a panel operatively mounted within the compartment.

25. The electronic scale of claim 13, further comprising a plurality of buttons disposed on the upper side of the head, the plurality of buttons being arranged to face generally upward when the handle is held in the upstanding orientation.

26. The electronic scale of claim 15, wherein the mouth of the battery compartment is disposed on a front side of the head.

27. An electronic scale holdable by a hand of a user for measuring weight of an object to be weighed, the electronic scale comprising:

a handle including a handle housing having a front side and a rear side opposite the front side, a top and a bottom below the top, and a gripping portion extending between the top and bottom, the gripping portion being configured to be grasped by the hand of the user, the handle configured to be held by the hand of the user in an upstanding orientation when in use for measuring the weight of the object;

a head supported by the handle, the head having an upward facing upper side and a downward facing lower side, a forward portion and a rearward portion rearward from the forward portion, the downward facing lower side including a bottom face portion configured to contact a top part of the hand of the user when the gripping portion is grasped by the hand of the user;

a weight sensor mounted at an elevation below the bottom face portion when the handle is held in the upstanding orientation with the bottom face portion in contact with the top part of the hand.

28. The electronic scale of claim 27, wherein the weight sensor comprises a load cell assembly that includes a connector body configured to connect to the object to be weighed, the connector body defining a weighing axis, the weighing axis extending through the handle housing.

29. The electronic scale of claim 24, wherein the handle includes a handle axis extending through the handle housing, the weighing axis and the handle axis coinciding to prevent the handle from torqueing while the object is being weighed.

30. The electronic scale of claim 28, wherein the gripping portion of the handle defines a first length and the connector body defines a second length, wherein the first length of the gripping portion is greater than the second length of the connector body.

31. The electronic scale of claim 27, wherein a space between the weight sensor and the bottom face portion of the head is free from a battery.

32. An electronic scale holdable by a hand of a user for measuring a weight of an object to be weighed, the electronic scale comprising:

a handle having a front side and a rear side opposite the front side, a top and a bottom below the top, and a gripping portion extending between the top and bottom, the gripping portion being configured to be grasped by the hand of the user, the gripping portion being configured to complement ergonomic contours of the hand while the hand is grasping the handle, the front side of the handle including a first indentation, the rear side of the handle including a second indentation;

a head supported by the handle, the head having an upward facing upper side and a downward facing lower side, a forward portion and a rearward portion rearward the forward portion, the downward facing lower side including a bottom face configured to contact a top part of the hand of the user when the gripping portion is grasped by the hand of the user;

wherein the handle and the bottom face of the head forms a smooth transition surface sized and shaped to receive an index finger and thumb of the hand of the user, the front side of the handle including a first concave portion configured to receive the index finger, the rear side of the handle including a second concave portion configured to receive a web portion of the user's hand, the first and second concave portions forming a neck of the handle, the neck of the handle comprises a smooth transition surface configured to receive the index finger and thumb of the hand of the user.

33. The electronic scale of claim 32, wherein the front side of the handle includes a protrusion adjacent the neck.

34. The electronic scale of claim 32, wherein the first indentation is sized differently than the second indentation.

35. The electronic scale of claim 32, wherein the handle is a pistol grip.

36. The electronic scale of claim 32, wherein the handle is overmolded with a thermoplastic elastomer material.

37. An electronic scale holdable by a hand of a user for measuring weight of an object to be weighed, the electronic scale comprising:

a handle including a handle housing having a front side and a rear side opposite the front side, a top and a bottom below the top, and a gripping portion extending between the top and bottom, the gripping portion being configured to be grasped by the hand of the user, the gripping portion having a first length extending in a lengthwise direction;

a head supported by the handle, the head having an upward facing upper side and a downward facing lower side, a forward portion and a rearward portion rearward from the forward portion, the downward facing lower side including a bottom face configured to contact a top part of the hand of the user when the gripping portion is grasped by the hand of the user;

a weight sensor;

a connector body configured to connect to the object to be weighed, the connector body having a second length extending in the lengthwise direction, the first length of the gripping portion being greater than the second length of the connector body.

38. The electronic scale of claim 37, wherein the lengthwise direction extends through the handle housing.

39. The electronic scale of claim 38, wherein the weight sensor is mounted closer to a bottom of the handle than the top of the handle.

40. The electronic scale of claim 39, wherein the weight sensor is mounted adjacent the bottom of the handle.

41. The electronic scale of claim 37, wherein the weight sensor is mounted below a top of the handle.

42. The electronic scale of claim 37, wherein the weight sensor is disposed inside the handle.

* * * * *